(12) United States Patent
Xavier et al.

(10) Patent No.: US 8,862,928 B2
(45) Date of Patent: Oct. 14, 2014

(54) TECHNIQUES FOR ACHIEVING HIGH AVAILABILITY WITH MULTI-TENANT STORAGE WHEN A PARTIAL FAULT OCCURS OR WHEN MORE THAN TWO COMPLETE FAULTS OCCUR

(75) Inventors: Felix Xavier, Bangalore (IN); Umasankar Mukkara, Bangalore (IN); Vishnu Govind Attur, Bangalore (IN)

(73) Assignee: CloudByte, Inc., San Mateo, CA (US)

( * ) Notice: Subject to any disclaimer, the term of this patent is extended or adjusted under 35 U.S.C. 154(b) by 183 days.

(21) Appl. No.: 13/606,563

(22) Filed: Sep. 7, 2012

(65) Prior Publication Data
US 2013/0073894 A1 Mar. 21, 2013

(30) Foreign Application Priority Data
Sep. 20, 2011 (IN) .............................. 3230/CHE/2011

(51) Int. Cl.
G06F 11/00 (2006.01)
G06F 11/20 (2006.01)
G06F 11/14 (2006.01)

(52) U.S. Cl.
CPC ........ *G06F 11/2092* (2013.01); *G06F 2201/85* (2013.01); *G06F 11/1482* (2013.01)
USPC ...................................................... 714/4.11

(58) Field of Classification Search
CPC ............ G06F 11/2005; G06F 11/2089; G06F 11/201; H04L 41/0659; H04L 41/0663
USPC ................................ 714/4.11, 4.12, 4.2, 4.21
See application file for complete search history.

(56) References Cited

U.S. PATENT DOCUMENTS

| | | | | |
|---|---|---|---|---|
| 7,055,056 B2 * | 5/2006 | Bessire | ......................... | 714/6.21 |
| 7,127,633 B1 * | 10/2006 | Olson et al. | ..................... | 714/4.4 |
| 7,139,925 B2 * | 11/2006 | Dinker et al. | .................. | 714/4.3 |
| 7,194,543 B2 * | 3/2007 | Robertson et al. | ............ | 709/226 |
| 8,010,833 B2 * | 8/2011 | Herta | .............. | 714/4.2 |
| 8,570,857 B2 * | 10/2013 | Scholl | ........... | 370/218 |
| 2004/0243915 A1 * | 12/2004 | Doyle et al. | ................... | 714/796 |
| 2005/0028028 A1 * | 2/2005 | Jibbe | ................ | 714/6 |
| 2010/0125682 A1 * | 5/2010 | Andres et al. | .................... | 710/19 |
| 2012/0233423 A1 * | 9/2012 | Crawford et al. | ............. | 711/162 |
| 2012/0260127 A1 * | 10/2012 | Jibbe et al. | .................... | 714/6.21 |
| 2012/0303999 A1 * | 11/2012 | Calder et al. | ................... | 714/6.3 |
| 2013/0007505 A1 * | 1/2013 | Spear | .......................... | 714/4.11 |
| 2013/0145206 A1 * | 6/2013 | Blinick et al. | ............... | 714/4.11 |
| 2013/0238930 A1 * | 9/2013 | Umbehocker | ............... | 714/6.32 |

* cited by examiner

*Primary Examiner* — Marc Duncan
(74) *Attorney, Agent, or Firm* — Schwegman Lundberg & Woessner, P.A.

(57) ABSTRACT

Techniques for achieving high availability (HA) in a cloud environment are presented. Cloud storage provided to multiple tenants is accessed via a plurality of controllers via a switch. The controllers are organized in a ring and each controller is responsible for detecting failures in adjoining controllers within the ring. Storage services for the tenants are serviced without disruptions even when multiple nodes completely fail at the same time.

20 Claims, 7 Drawing Sheets

TECHNIQUES FOR ACHIEVING HIGH AVAILABILITY WITH MULTI-TENANT STORAGE WHEN A PARTIAL FAULT OCCURS OR WHEN MORE THAN TWO COMPLETE FAULTS OCCUR

RELATED APPLICATIONS

The present application is co-pending with and claims foreign priority to Indian Provisional Patent Application No. 3230/CHE/2011 entitled: "Architecture and Method for Achieving Continuous Availability of Storage Services in a Cloud Storage Environment," filed with the Indian Patent Office on Sep. 20, 2011, the disclosure of which is incorporated by reference herein in its entirety.

BACKGROUND

Cloud computing is rapidly changing the Internet into a collection of clouds, which provide a variety of computing resources, storage resources, and, in the future, a variety of resources that are currently unimagined.

Specifically, cloud computing is a technology infrastructure that facilitates: supplementing, consuming, and delivering Information Technology (IT) services. The cloud environment provides elastic provisioning of dynamically scalable virtual services.

A tenant is considered as a subscriber of some amount of storage in the cloud or an application who owns part of the shared storage environment. Multi-tenancy is an architecture where a single instance of software runs on a server, which is serving multiple tenants. In a multi-tenant environment, all tenants and their users consume the service from a same technology platform, sharing all components in the technology stack including the data model, servers, and database layers. Further, in a multi-tenant architecture, the data and configuration is virtually partitioned and each tenant works with a customized virtual application instance.

A multi-tenant storage controller hosts multiple storage tenants. A group of such storage controllers clubbed together provides the High Availability (HA) of storage services for tenants. Traditional high availability methods fail if a failure happens to both the controllers in the pair.

Moreover, in today's storage controllers, the HA of storage services is made possible by bringing up all the storage services in a monolithic fashion. The limitation of such controllers and corresponding architecture are that the storage services are treated as global and the state of a storage service in a storage controller is not replicated to the other storage controller on a periodic basis. So, when a failure occurs in the controller, the failure is always observed with respect to the controller and not from the perspective of the consumer (tenant) of the storage provided by the controller.

With such monolithic architectures, when a partial failure happens in the controller, though some of the storage services are affected, all the storage services are moved to a stand-by controller. This includes the services that are not affected by the failure.

For example, when a partial fault happens at a storage controller (SC1) and if service 1 (S1) is affected, the traditional approach is to move the control to storage controller 2 (SC2). In this process, all the unaffected services, including service 2 (S2) and service 3 (S3) are also moved to the SC2. This happens because of the monolithic architecture of conventional storage controllers. Another problem with traditional storage controllers is that if a fault occurs in both controllers (SC1 and SC2), storage services become completely unavailable.

SUMMARY

Various embodiments of the invention provide techniques for achieving HA in a storage environment. Specifically, and in one embodiment a method for HA in a cloud environment is presented.

More particularly and in an embodiment, a failure of a storage controller is detected in a cloud storage environment. A different storage controller is then configured to process storage services that operated on the failed storage controller. Then, the different storage controller is instructed to start the storage services and the tenants associated with the storage services are redirected from the failed storage controller to the different storage controller.

DETAILED DESCRIPTION

A "resource" includes a user, service, system, device, directory, data store, groups of users, a file, a file system, combinations and/or collections of these things, etc. A "principal" is a specific type of resource, such as an automated service or user that acquires an identity. As used herein a "principal" may be used synonymously and interchangeably with the term "tenant."

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X and be logically combined with another computing resource at network site Y to form a logical processing environment.

The phrases "processing environment," "cloud processing environment," "cloud environment," and the term "cloud" may be used interchangeably and synonymously herein.

Moreover, it is noted that a "cloud" refers to a logical and/or physical processing environment as discussed above.

The techniques presented herein are implemented in machines, such as processor or processor-enabled devices (hardware processors). These machines are configured and programmed to specifically perform the processing of the methods and systems presented herein. Moreover, the methods and systems are implemented and reside within a non-transitory computer-readable storage media or machine-readable storage medium and are processed on the machines configured to perform the methods.

It is within this context that embodiments of the invention are now discussed within the context of the FIGS. 1-5.

Figure 1A:
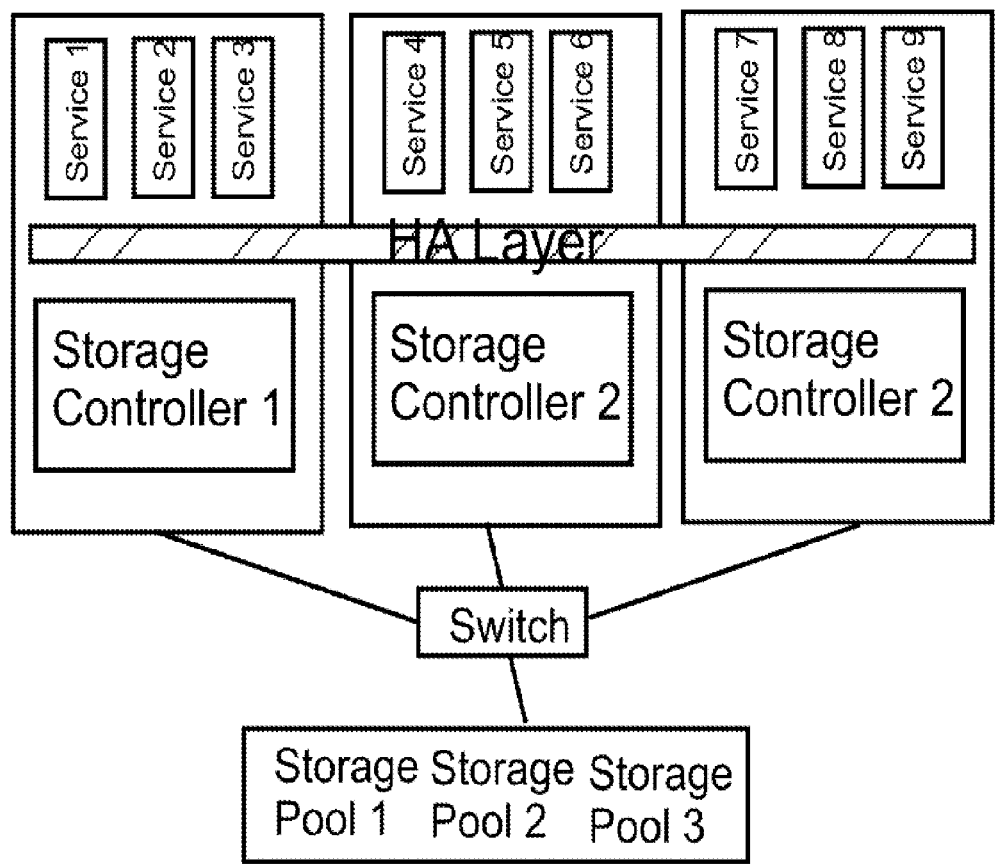
FIG. 1A is a diagram depicting an architecture for HA within a cloud storage environment on failure, according to embodiments presented herein.

FIG. 1A is a diagram depicting an architecture for HA within a cloud storage environment on failure, according to embodiments presented herein. It is noted that the architecture is presented as one example embodiment as other arrangements and elements are possible without departing from the teachings presented herein.

At the outset it is noted that the techniques and architectures herein and below demonstrate how storage services of a particular tenant are brought up automatically when either a partial failure in the controller occurs or when the complete failure of the controller occurs. The unique techniques allow the tenant storage services to be brought up seamlessly when either a partial or a complete failure occurs and without causing any data loss during the transition.

Moreover, the techniques herein provide for the HA among a group of controllers, not just a pair of controllers, hence the HA is provided for a complete failure of N−1 nodes where N is the number of controllers in the group (N>2). The techniques provide for an auto discovery mechanism that identifies the primary and secondary storage nodes. Further, the techniques prescribe a mechanism in which if the configuration changes, the storage tenants are dynamically passed to the other side (different storage controller in a cluster) so that auto discovery of the storage nodes can happen.

The storage services inside the controllers are tenant aware and unique techniques are applied to move the storage services from one controller to another storage controller. When a failure happens, the failure is observed with respect to the affected storage tenants. The affected storage tenants are moved to an available controller in the group. When the failed controller comes back (dead to alive), unique techniques are applied to safely move the storage services back to the original controller.

Still further, the techniques provide a mechanism in which only affected storage services are moved to a standby storage controller. These techniques include support for HA of storage services until N−1 nodes fail, where N is the number of storage controllers in the cluster group.

As will become apparent herein above and below, the techniques herein provide for a variety of novel benefits, such as but not limited to:

1) addressing the issue of making the storage services available when two or more controllers fails at the same time;
2) addressing the issue of unnecessarily bringing down unaffected storage services on a storage controller when a partial fault happens;
3) prescribing a technique for detecting whether an active storage controller has stopped accessing a common storage after a fault happens so that the new storage controller can mount the storage;
4) prescribing a mechanism to know an active node has gone down in a cluster of nodes; and
5) prescribing a technique in which there is no loss of "write cache" when multiple storage controller failures happen in a cluster of N nodes where N is greater than 2.

Now referring to sample architecture depicted in the FIG. 1A.

Embodiments herein prescribe the above architecture (depicted in the FIG. 1A) for achieving HA of storage services running in a cluster of storage controllers.

As shown in the FIG. 1A, the storage controllers are deployed in such a fashion where the storage is connected to all the controllers via a switch. The storage is detected by all the controllers connected to the switch. A software layer called HA-layer runs across the storage controller nodes and detects the failure of a particular node and notifies the rest of the nodes or a central node. A decision is then taken to move the storage services to an available node.

Figure 1B:
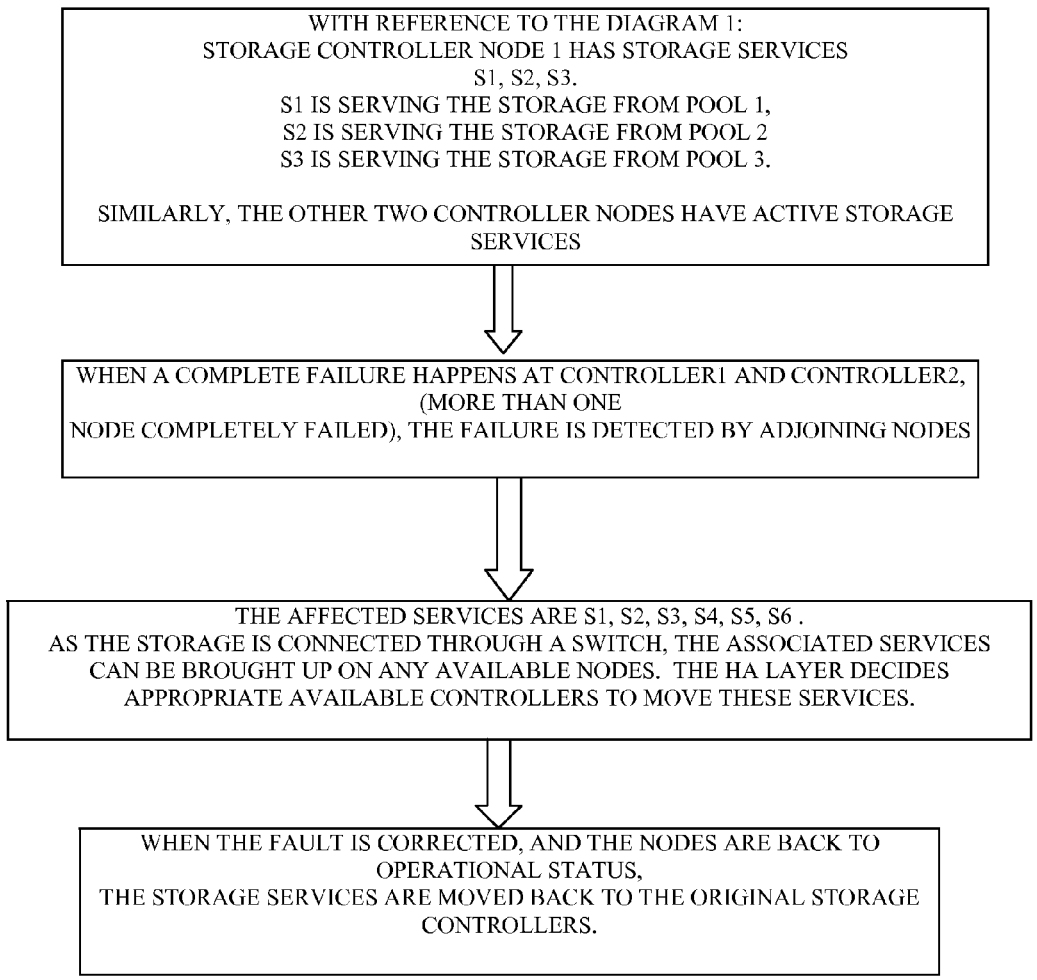
FIG. 1B is a sample sequence of operations and scenario for HA using the architecture of the FIG. 1A when one or more nodes completely fail, according to embodiments presented herein.

The FIG. 1B depicts a sample scenario (sequence of actions) that uses the architecture of the FIG. 1A for purposes of further illustration related to HA when one or more nodes completely fail.

Figure 2A:
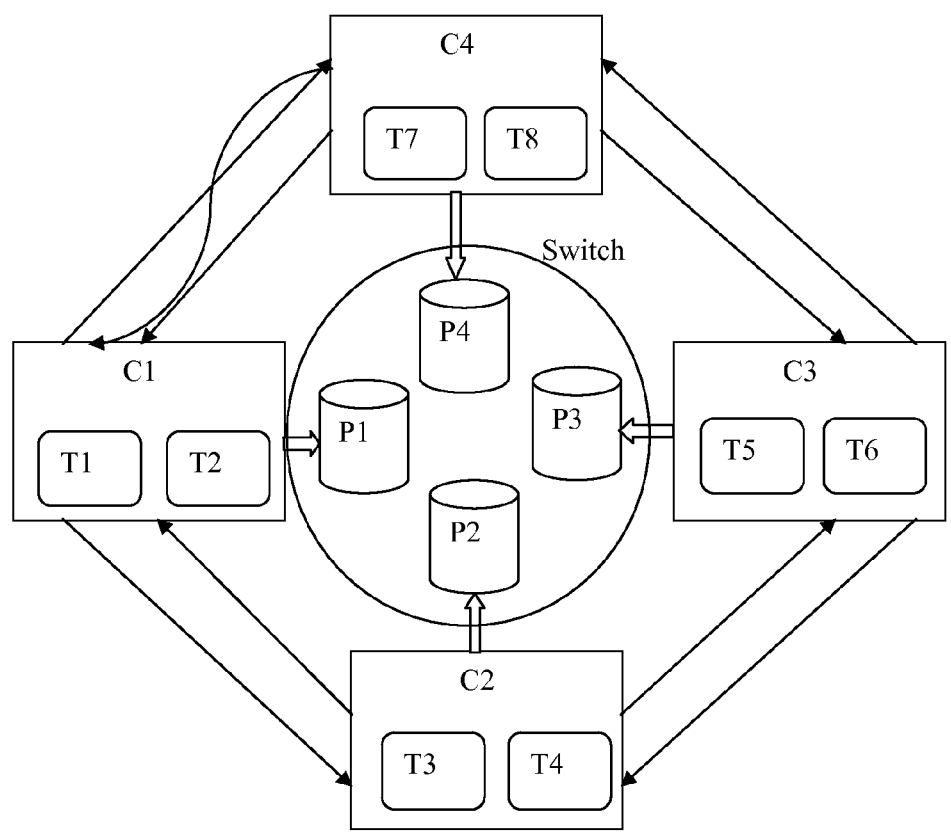
FIG. 2A is another architecture depicting a HA ring layer for detecting node failures, according to embodiments presented herein.

FIG. 2A is another architecture depicting a HA ring layer for detecting node failures, according to embodiments presented herein.

Technique for Detection of Hard Disk Control or Relinquishment of Control

When a disk is connected to both the storage controllers, the active node marks that disk as primary disk, and the inactive node marks that node as a secondary disk. When the active node fails or goes down, the inactive node now marks its disk as the primary disk and brings up the needed storage services on that node. However, in this process, if the inactive node tries to mark the disk as primary while the other node is still active (because of a total network communication failure between the storage controller nodes), the data on the disk will be corrupted. To avoid this situation, the techniques herein prescribe a mechanism in which a common label is created and updated every second by the active node. The inactive node, while the takeover process is enforced, checks for the disk-label value not being changed over a few seconds and only then continues with the takeover process.

The HA layer has RING mode logic for failure detection. In this model, each node is responsible for detection of failure of either of its side nodes. When a node fails, it is removed from the RING and when a node is activated, it is introduced into the chain/RING.

The cluster of nodes is organized in a ring formation. Each controller has active TSM (Tenant Storage Machine or a storage service) and manages active storage pools. For example, in the FIG. 2A, the controller node C1 is in a cluster of 4 nodes. C1 has 2 TSMs T1 and T2 and C1 manage storage pool P1. In the ring, each node is connected to its adjacent 2 nodes for failure detection and each node knows the position of every other node in the ring. C1 is connected to C2 and C4, and knows the order or position of every node in the ring.

Failure Detection

If controller node C1 or any of its tenants on P1 go down, both C2 and C4 detect the event and inform HA provisioning service about the same.

Take Over

The provisioning service determines which of the remaining nodes among C2, C3 and C4 should take over the TSM services from C1 and manage pool P1. Several factors are considered during this decision making like available CPU, memory, storage among others. The appointed node say C2, then starts managing the pool P1 and brings up tenants T1 and T2 on C2.

Ring Re-Formation

The controller nodes C2 and C4 are linked and the ring is re-formed. Even if more than one node goes down at the same time, the remaining nodes know the positions and can dynamically re-form the ring.

Give Back

When node C1 is rectified, it re-enters the ring and requests control of its tenants and pool. The provisioning service may then instruct C2 to relinquish management of pool P1 and TSMs T1 and T2 to C1.

Figure 2B:
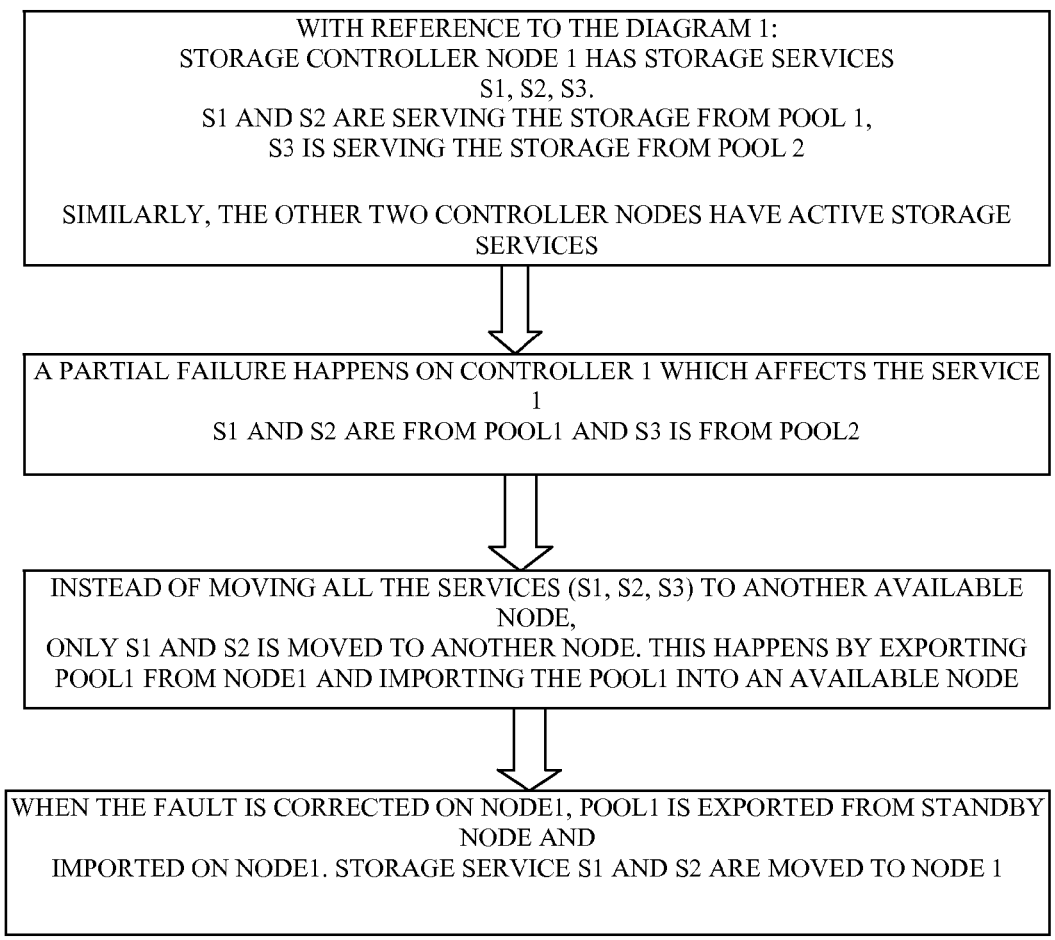
FIG. 2B is a sample sequence of operations and scenario for a partial failure using the architecture of the FIG. 1A or the FIG. 2A, according to embodiments presented herein.

FIG. 2B is a sample sequence of operations and scenario for a partial failure using the architecture of the FIG. 1A or the FIG. 2A, according to embodiments presented herein.

Figure 3:
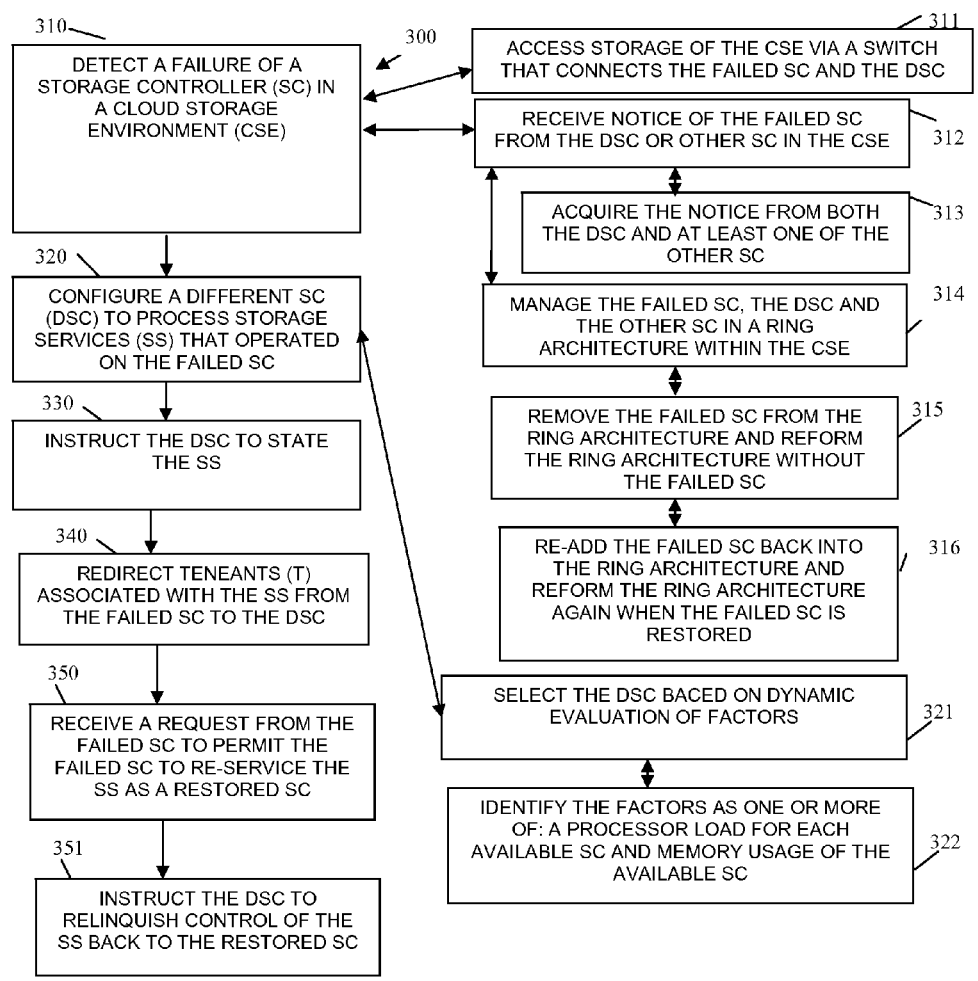
FIG. 3 is a diagram of a method for providing HA in a cloud storage environment, according to embodiments presented herein.

FIG. 3 is a diagram of a method 300 for providing HA in a cloud storage environment, according to embodiments presented herein. The method 300 (herein referred to as "HA manager") is implemented, programmed, and resides within a non-transitory machine-readable storage medium that executes on one or more processors of a network. The network may be wired, wireless, or a combination of wired and wireless.

In an embodiment, the HA manager is deployed and utilizes the architectures presented above with respect to the FIGS. 1A and/or 2A.

At 310, the HA manager detects a failure of a storage controller in a cloud storage environment. This can occur in a variety of manners, as discussed below. Moreover, in an embodiment, the HA manager is the HA layer presented in the FIG. 1A above and discussed above within the context of the FIG. 1A.

According to an embodiment, at 311, the HA manager accesses storage of the cloud storage environment via a switch that connects the failed storage controller and the different storage controller. That is, multiple storage controllers all access the storage of the cloud storage environment via a switch, such as the switch shown above with reference to the FIG. 1A.

In an embodiment, at 312, the HA manager receives a notice of the failed storage controller from the different storage controller or other storage controllers in the cloud storage environment. That is, the storage controllers are responsible for monitoring each other and detecting a failure and reporting the same to each other and to the HA manager.

Continuing with the embodiment of 312 and at 313, the HA manager acquires the notice from both the different storage controller and at least one other of the other storage controllers. That is, when the storage controllers are arranged in a ring architecture as discussed above and below, the two nodes that are connected in the ring to the failed node (failed storage controller) both remote the failed node to the HA manager.

Still continuing with the embodiment of 312 and at 314, the HA manager manages the failed storage controller, the different storage controller, and the other storage controllers in a ring architecture within the cloud storage environment, as shown above with reference to the FIG. 2A.

Continuing with the embodiment of 314 and at 315, the HA manager removes the failed storage controller from the ring architecture and reforms the ring architecture without the failed storage controller. This can be done via instruction to the remaining active storage controllers within the ring architecture or can be done by the remaining active storage controllers on their own initiative.

Still continuing with the embodiment of 315 and at 316, the HA manager re-adds the failed storage controller back into the ring architecture and reforms the ring architecture again when the failed storage controller is restored. Again, the active nodes of the architecture may do this dynamic adjustment to the architecture on their own as well.

At 320, the HA manager configures a different storage controller to process storage services that operated on the failed storage controller. This is a dynamic and real-time process, where the HA manager designates another storage controller to take over and process the storage services of the failed storage controller.

According to an embodiment, at 321, the HA manager selects a different storage controller based on dynamic evaluation of predefined factors.

For example, at 322, the HA manager identifies and considers the factors as one or more of: a process load for the available storage controllers of the cloud storage environment and the memory usage of the available storage controllers.

At 330, the HA manager redirects the tenants associated with the storage services from the failed storage controller to the different storage controller. So, there is no disruption in service for the tenants as this failover processing within the cloud storage environment occurs unbeknownst to the tenants.

In an embodiment, at 331, the HA manager receives a request from the failed storage controller to permit that failed storage controller to re-service the storage services as a restored storage controller. This occurs when the failed controller comes back online.

Continuing with the embodiment of 331 and at 332, the HA manager instructs the different storage controller to relinquish control of the storage services back to the restored storage controller.

Figure 4:
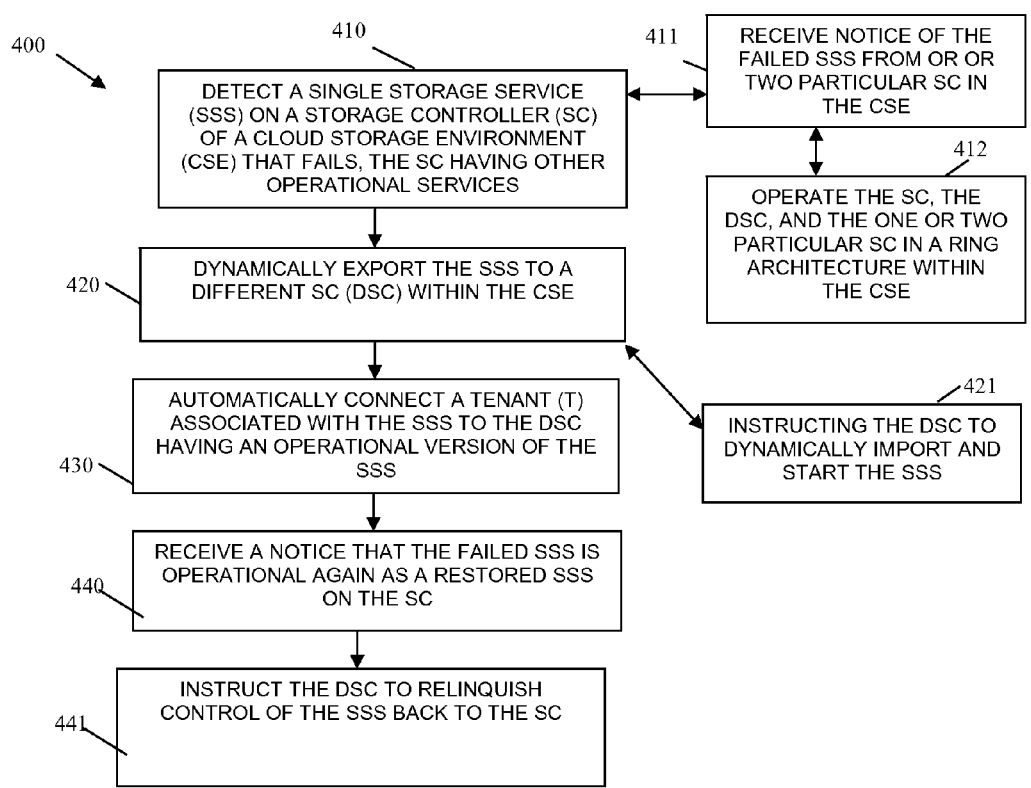
FIG. 4 is a diagram of another method for providing HA in a cloud storage environment, according to embodiments presented herein.

FIG. 4 is a diagram of another method 400 for providing HA in a cloud storage environment, according to embodiments presented herein. The method 400 (herein referred to as "HA controller") is implemented, programmed, and resides within a non-transitory machine-readable storage medium that executes on one or more processors of a network. The network may be wired, wireless, or a combination of wired and wireless.

The HA controller presents another and in some cases enhanced perspective of the HA manager represented by the method 300 of the FIG. 3. Moreover, the HA controller is implemented or deployed within the architectures of the FIGS. 1A and/or 2A.

Specifically, the HA manager of the FIG. 3 represents processing when an entire storage controller or even a set of storage controllers fail, whereas the HA controller represents processing when a single service fails on a particular storage controller when other storage services are active and fine on that storage controller. This was discussed above as a partial failure.

At 410, the HA controller detects a single storage service on a storage controller of a cloud storage environment that fails. It is noted that the storage controller has other operational storage services that are processing fine on the storage controller. So, a partial failure with respect to a particular storage tenant of the cloud storage environment.

According to an embodiment, at 411, the HA controller receives a notice of the failed single storage service from one or two particular storage controllers in the cloud storage environment. This situation was discussed above with reference to the FIG. 3.

Continuing with the embodiment of 411 and at 412, the HA controller operates the storage controller, the different storage controller (discussed at 420), and the one or two particular storage controllers in a ring architecture within the cloud storage environment, as discussed above and presented with the FIG. 2A.

At 420, the HA controller dynamically exports the single storage service to a different storage controller within the cloud storage environment. So, the different storage controller is contacted and configured to install and load the single storage service.

In an embodiment, at 421, the HA controller instructs the different storage controller to dynamically import and start the single storage service on the different storage controller.

At 430, the HA controller automatically connects a tenant associated with the single storage service to the different storage controller that has an operating version of the single storage service.

According to an embodiment, at 440, the HA controller receives a notice that the failed single storage controller is operational again as a restored single storage service on the storage controller.

Continuing with the embodiment of 440 and at 441, the HA controller instructs the different storage controller to relinquish control of the single storage service back to the storage controller.

It is to be noted that although the discussion of the FIG. 4 focused on a single storage service failing on a particular storage controller this does not have to be the case as any subset of services can fail on a particular controller and the techniques presented with the FIG. 4 will work well.

Figure 5:
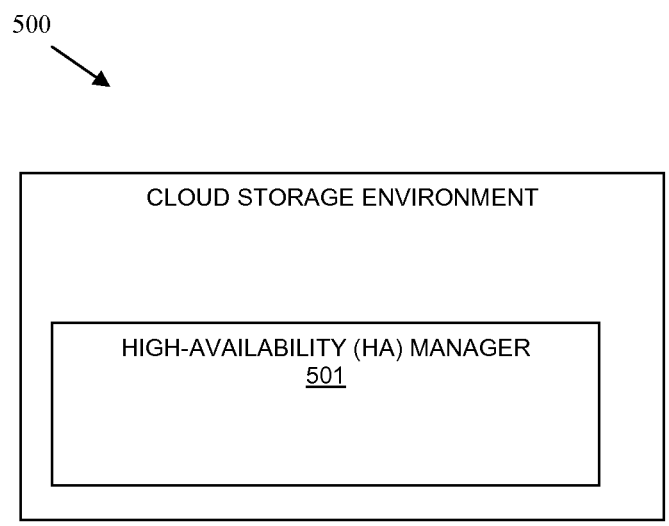
FIG. 5 is a diagram of a HA cloud storage system, according to embodiments presented herein.

FIG. 5 is a diagram of a HA cloud storage system 500, according to embodiments presented herein. The components of the HA cloud storage system 500 are implemented, programmed, and reside within a non-transitory machine-readable storage medium that executes on one or more processors of a network. The network may be wired, wireless, or a combination of wired and wireless.

In an embodiment, the HA cloud storage system 500 implements, inter alia, the processing associated with the methods 300 and 400 of the FIGS. 3 and 4, respectively using the architectures provided by the FIG. 1A and/or FIG. 2A.

The HA cloud storage system 500 includes a cloud storage environment having a HA manager 501.

The HA cloud storage system 500 includes a cloud storage environment that has one or more processors, memory, and storage.

The memory of the cloud storage environment is configured with the HA manager 501, which is implemented as executable instructions that process on one or more processors of the cloud storage environment. Example processing associated with the HA manager 501 was presented above in detail with reference to the FIGS. 1A, 1B, 2A, 2B, 3, and 4.

The HA manager 501 is configured to detect complete failures of storage controllers or partial failures of particular storage services on particular storage controllers. Moreover, the HA manager 501 is configured to reconfigure the storage controllers to provide access to any failed storage service.

According to an embodiment, the storage controllers organize and self-adjust one another within a ring architecture.

Continuing with the previous embodiment, the storage controllers are configured to self-organize and reform the ring architecture dynamically based on failed storage controllers and restored storage controllers.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method implemented in a non-transitory machine-readable storage medium and processed by one or more processors of a machine configured to perform the method, comprising:
    detecting, on the machine, a failure of a storage controller in a cloud storage environment;
    configuring, from the machine, a different storage controller to process storage services that operated on the failed storage controller;
    instructing, from the machine, the different storage controller to start the storage services; and
    redirecting, via the machine, the tenants associated with the storage services from the failed storage controller to the different storage controller, wherein each tenant is a consumer to some amount of the cloud storage and the cloud storage is a multi-tenant environment and wherein each tenant consumes the storage services from the cloud storage but each tenant accesses a customized virtual application instance of the storage services for that tenant.

2. The method of claim 1, wherein detecting further includes accessing storage of the cloud storage environment via a switch that connects the failed storage controller and the different storage controller.

3. The method of claim 1, wherein detecting further includes receiving notice of the failed storage controller from the different storage controller or other storage controllers in the cloud storage environment.

4. The method of claim 3, wherein receiving further includes acquiring the notice from both the different storage controller and at least one other of the other storage controllers.

5. The method of claim 3, wherein receiving further includes managing the failed storage controller, the different storage controller and the other storage controllers in a ring architecture within the cloud storage environment.

6. The method of claim 5, wherein managing further includes removing the failed storage controller from the ring architecture and reforming the ring architecture without the failed storage controller.

7. The method of claim 6, wherein removing further includes re-adding the failed storage controller back into the ring architecture and reforming the ring architecture again when the failed storage controller is restored.

8. The method of claim 1, wherein configuring further includes selecting the different storage controller based on dynamic evaluation of factors.

9. The method of claim 8, wherein selecting further includes identifying the factors as one or more of: a processor load for each available storage controller and a memory usage for each available storage controller.

10. The method of claim 1 further comprising, on the machine, receiving a request from the failed storage controller to permit the failed storage controller to re-service the storage services as a restored storage controller.

11. The method of claim 10 further comprising, instructing, via the machine, the different storage controller to relinquish control of the storage services back to the restored storage controller.

12. A method implemented in a non-transitory machine-readable storage medium and processed by one or more processors of a machine configured to perform the method, comprising:

detecting, on the machine, a single storage service on a storage controller of a cloud storage environment that fails, the storage controller having other operational storage services;

dynamically exporting, from the machine, the single storage service to a different storage controller within the cloud storage environment; and automatically connecting, via the machine, a tenant associated with the single storage service to the different storage controller having an operational version of the single storage service, and wherein the tenant is a consumer to some amount of the cloud storage environment and the cloud storage environment is a multi-tenant environment servicing multiple other tenants and the single storage service is a customized virtual application instance for the tenant.

13. The method of claim 12, wherein detecting further includes receiving a notice of the failed single storage service from one or two particular storage controllers in the cloud storage environment, the one or two particular storage controllers are controllers configured to monitor and report on failures of the single storage service.

14. The method of claim 13, wherein receiving further includes operating the storage controller, the different storage controller, and the one or two particular storage controllers in a ring architecture within the cloud storage environment.

15. The method of claim 12, wherein dynamically exporting further include instructing the different storage controller to dynamically import and start the single storage service.

16. The method of claim 12 further comprising, receiving, on the machine, a notice that the failed single storage service is operational again as a restored single storage service on the storage controller.

17. The method of claim 16 further comprising, instructing, from the machine, the different storage controller to relinquish control of the single storage service back to the storage controller.

18. A system, comprising:

a cloud storage environment having one or more processors, memory, and storage, the cloud storage environment situated in a cloud environment and accessed over a network; and the memory configured with a high-availability (HA) manager implemented as executable instructions that process on the one or more processors of the cloud storage environment;

wherein the HA manager is configured to detect complete failures of storage controllers or partial failures of particular storage services on particular storage controllers, and wherein the HA manager is configured to reconfigure the storage controllers to provide access to any failed storage service, and wherein the cloud storage environment is a multi-tenant environment that services multiple tenants, each tenant is a consumer that consumes some portion of the cloud storage environment and wherein each tenant consumes the storage services from the cloud storage environment but each tenant accesses a customized virtual application instance of the storage services for that tenant.

19. The system of claim 18, wherein the storage controllers are organized in a ring architecture.

20. The system of claim 19, wherein the storage controllers are configured to self-organize and reform the ring architecture dynamically based on failed storage controllers and restored storage controllers.

* * * * *